3,465,206
TIME DELAY CIRCUIT BREAKER WITH SHORT-CIRCUIT BYPASS
James Lincoln Harker, Minneapolis, and Robert T. Kendall, Hopkins, Minn., assignors to Litton Systems, Inc., Beverly Hills, Calif., a corporation of Maryland
Filed Dec. 5, 1966, Ser. No. 598,989
Int. Cl. H02h 7/00, 1/04, 3/00
U.S. Cl. 317—13                         9 Claims

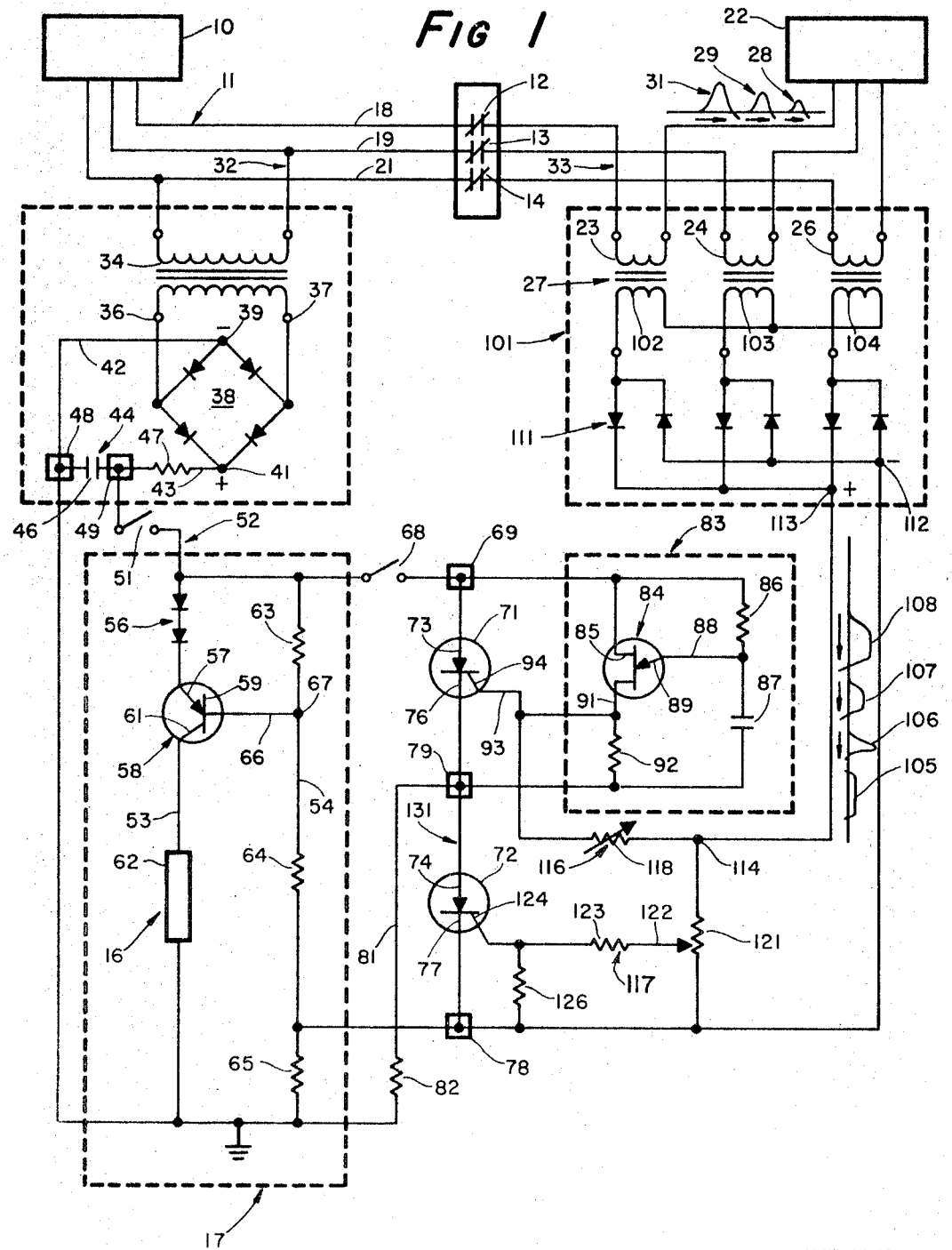

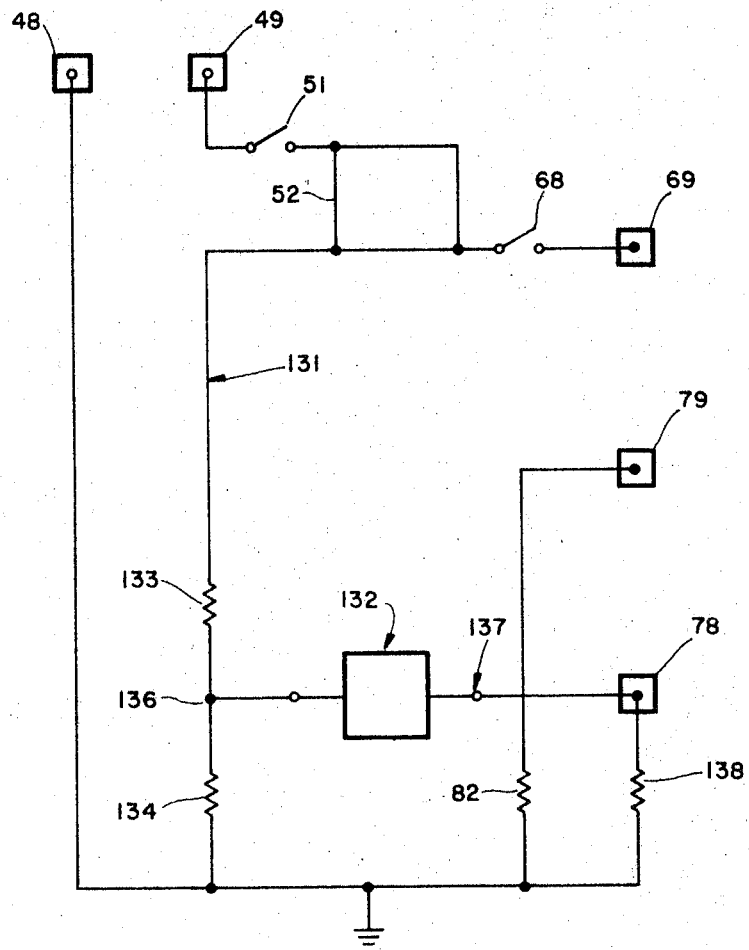

ABSTRACT OF THE DISCLOSURE

A three-phase power source supplies line power to a load circuit connected to a load through a relay. A control power circuit connected to the load circuit energizes the relay during normal operation of the load. A pair of series connected silicon control rectifiers (SCR's) conduct simultaneously in response to an overload condition or a short-circuit condition in the load, but do not conduct simultaneously in response to a normal start-up current surge even though the normal start-up current surge has an amplitude that exceeds the overload amplitudes. Upon simultaneous conduction of the pair of SCR's, the relay is immediately opened to protect the load from the overload or short-circuit condition.

---

This invention relates to a circuit breaker and, more particularly, to a motor protection circuit which provides instantaneous short-circuit protection, a time lag sufficient for motor starting and instantaneous steady state circuit interruption in response to an overload condition.

Prior circuit breakers of the thermally actuated type provide a motor starting time delay by making the trip time proportional to the generation of heat within the breaker. However, this type of operation provides considerable delay both in steady state overload conditions as well as in transient overload conditions, such as during start-up. Accordingly, because of the considerable time delay, an overload condition can produce serious motor damage prior to the time the circuit breaker opens.

Another prior circuit breaker is the magnetic type which is operated by actuating a spring-loaded, movable iron core within a solenoid coil. The time delay is introduced by placing the core in a liquid, such as liquid silicon, to dampen the movement of the core. As in the case of the thermally actuated circuit breakers, the dampened movement of the core provides a sufficient time delay to allow motor starting, but it also provides a definite lag which is present in steady state overload conditions.

It may be understood that the magnetic and thermal types of circuit breakers fail to provide instantaneous opening of the motor circuit in response to overload conditions, hence there is a certain amount of danger presented and motors are subject to burnout notwithstanding the inclusion of such circuit breakers in the motor circuit.

While providing a time-delay sufficient to permit starting of the motor, the circuit of the present invention provides instantaneous short-circuit protection and may be utilized in conjunction with solid state power switching devices or mechanical relay contactors. In combination with solid state power switching, the time required to open the circuit (turn-off time) is one cycle at either 60 or 400 cycles per second. With mechanical relay contactors, the relay coil is de-energized by the present circuit within 10 microseconds, thus, the turn-off time using the mechanical relay contactors is limited only by the 10 millisecond release time of the contactors. Compared with the substantially instantaneous operation of the present circuit, prior circuit breakers have required as much as 200 seconds to trip at 150 percent of rated current and requires as much as three-tenths of a second at a 1000% of rated current, whereas the present circuit will open the motor circuit in 2.5 milliseconds at similar values of rated current.

An object of the present invention is to provide a new and improved circuit breaker.

A further object of the present invention is to provide a circuit breaker which is responsive to overload and short-circuit conditions and which permits normal current surges to exist during start-up.

A still further object of the present invention is to provide in a circuit breaker a pair of series connected silicon control rectifiers (SCR's) which conduct simultaneously during overload and short-circuit conditions, but which do not conduct simultaneously during normal start-up current surges even though the start-up current surges exceed current surges during overload conditions.

Another object of the present invention is to provide a circuit breaker circuit including a pair of series connected SCR's, wherein a first SCR is conditioned for operation through either a delay network which maintains the first SCR non-conductive during a normal start-up current surge or a blocking network which bypasses the delay network, so that upon the occurrence of overload or short-circuit conditions, the first SCR will be conductive.

With these and other objects in view, the present invention contemplates provision of a three phase power source for supplying line power to a load circuit which is connected to a load through a switching device such as a power contactor type relay. A control-power circuit is connected to the load circuit for energizing a relay circuit which is effective to maintain the contacts of the power contactor drawn up to operate the load. A pair of series connected silicon control rectifiers (SCR's) conduct simultaneously upon the occurrence of an overload condition or a short-circuit condition in the load and are effective to open the relay circuit.

In particular, a current converter is provided for converting a first current surge indicative of a start-up condition into a first control signal and converting a second current surge indicative of an overload condition into a second control signal. The converter also converts a third current surge indicative of a short-circuit condition in the load to a third control signal. In the normal start-up of the load, power from the control-power circuit is applied to the anode of a first of the SCR's and to a delay network which delays application of the power to a first gate of the first SCR. During an interval of time in which the normal start-up current surge is present, the delay network maintains the first SCR in an off condition.

A blocking network connected between the converter and the first gate precludes application to the first gate of the first control signal so that neither the power from the control-power circuit nor the first control signal is applied to the first gate during start-up. A second blocking network passes the first, second and third control signals to a gate of the second SCR to condition the second SCR for operation. Because the first SCR is non-conductive during start-up and because the second SCR is only conditioned for conduction, the relay circuit is not opened and the power contactors remain closed to permit normal start-up of the load.

During normal operation of the load, the delay network is effective to apply the power to the first gate of the first SCR which renders the first SCR conductive. If an overload condition or a short-circuit condition develops in the load circuit, the converter generates the second or third control signals which are passed by the second blocking network to the second gate of the second SCR which renders the second SCR conductive. Simultaneous conduction of the first and second SCR's is effective to deenergize the relay in the relay circuit so that the contacts thereof in the load circuit are opened and no power is applied from the 3-phase source to the load. In addition, if a short-circuit condition develops during start-up of the load, a first blocking network connected between the converter and the first gate of the first SCR is effective to pass the third control signal directly to such first gate so that notwithstanding the delay interposed by the delay network, both the first and second SCR's conduct simultaneously. The relay circuit is then opened so that the power contactors are immediately opened and damage to the load is prevented.

A complete understanding of the present invention may be had by referring to the following detailed descriptions and the accompanying drawings illustrating a preferred embodiment thereof, in which FIG. 1 is a schematic circuit diagram illustrating a circuit breaker constructed according to the principles of the present invention; and FIG. 2 is a schematic circuit diagram of an alternate embodiment of the circuit breaker of the present invention.

Referring now to FIG. 1 of the drawings, there is shown a source of power, such as a 3-phase source 10, which is connected to a load circuit 11. The load circuit 11 includes contacts 12, 13 and 14, operated by a relay 16 in a relay circuit 17. The contacts 12, 13 and 14 are connected to respective conductors 18, 19 and 21. Each conductor 18, 19 and 21 is connected to a load 22 through one of three primary windings 23, 24 and 26 of a current transformer 27. The load 22 may be, for example, a 3-phase motor. In the normal operation of the motor 22, the motor will draw a normal, generally pre-determined load current such that the motor 22 will not be subject to overheating or overloading. During start-up of the motor 22, a relatively high load current, such as six times the normal load current, is drawn through the load circuit 11, but this relatively high load current is drawn for only a short period of time, such as a few seconds, after which the current drawn by the motor 22 decreases to the normal load current value. This short duration load current may be termed a first current surge 28. Under certain load conditions, the motor 22 will draw an excessive load current at which time it is said to be operating in an overload condition. Such overload current may be termed a second current surge 29 and, for example, may be approximately 1.4 times the normal load current. If, for example, a short circuit develops in the load, an excessive load current will be drawn in the load circuit and severe damage will be created in either the load circuit 11 or the motor 22 if the load circuit is not immediately opened. The short circuit condition produces a third current surge 31 which may, for example, be about eight times the normal load current. In these situations, where the first current surge 28 is produced in response to start-up or in the case of the second current surge 29 in the overload condition or the third current surge 31 in the short-circuit condition, the circuitry of the present invention provides a reliable and rapid way to prevent the overload condition from existing for more than a fraction of a second.

The circuitry of the present invention is shown in FIGURE 1 including two inputs 32 and 33 from the load circuit. The first input 32 is provided by a first transformer 34 which is connected across terminals 36 and 37 of a standard full wave bridge 38. Connected across opposite terminals 39 and 41 of the full wave bridge 38 are D.C. output lines 42 and 43 which are connected across a filter network 44 which includes a capacitor 46 and a resistor 47. Filtered D.C. is conducted from a first terminal 48 to ground and from a second terminal 49 of the filter network 44 across a motor control switch 51 to an input conductor 52 to the relay circuit 17. The relay circuit 17 includes a pair of parallel circuits 53 and 54, the first circuit 53 of which includes a pair 56 of series connected silicon diodes, such as IN4002 diodes, which are connected to the emitter 57 of a normally-on transistor 58 having a base 59 and a collector 61. The collector 61 of the transistor 58 is connected to a coil 62 of the relay 16 to the ground. Also connected to the input conductor 52 is a series connection of first, second, and third biasing resistors 63, 64 and 65, respectively. Intermediate to the biasing resistors 63 and 64 is a conductor 66 connected to the base 59 of the transistor 58. With the motor control switch 51 closed and in the normal operation of the relay circuit 17, the potential applied to the junction 67 of the biasing resistors 63 and 64, sufficient to maintain the transistor 58 conductive so that the coil 62 will be energized for drawing up the contacts 12, 13 and 14.

Still considering the first input 32 from the load circuit 16, it may be understood that the motor control switch 51 is connected to a normally closed anode control switch 68. The switch 68 is connected to a terminal 69 and control rectifiers 71 and 72, respectively. The anode 73 of the first SCR 71 is connected to the anode control switch 68 and the anode 74 of the second silicon control rectifier 72 is connected to the cathode 76 of the first SCR 71. The cathode 77 of the second SCR 72 is connected to a terminal 78 which is connected intermediate the second and third biasing resistors 64 and 65 of the relay circuit 17. Also, intermediate the cathode 76 of the first SCR 71 and the anode 74 of the second SCR 72 there is provided a terminal 79 connected to a conductor 81 which leads to ground through a biasing resistor 82.

With both the motor control switch 51 and the anode control switch 68 closed and during normal operating of the motor 22, the biasing resistor 82 permits a small current to leak to ground to maintain the first SCR 71 in a conductive condition.

Considering start-up of the motor 22, the D.C. signal from the filter network 44 is applied across the motor control switch 51 and the anode control switch 68 and is applied to the anode 73 of the first SCR 71. The signal is also applied to a delay network 83 connected to the terminal 69 and to the anode control switch 68. The delay network 83 includes a combination of a unijunction transistor 84, such as a 2N489 transistor, having an anode 85 connected to the terminal 69. The transistor 84 is connected in parallel with a biasing resistor 86, which is connected in series with a capacitor 87. Intermediate the biasing resistor 86 and the capacitor 87, a conductor 88 is connected to the emitter 89 of the unijunction transistor 84. The base 1 or cathode 91 of the unijunction transistor 84 is connected across a biasing resistor 92 to the terminal 79 which is connected to the cathode 76 of the first SCR 71.

During an initial period of time after closure of the motor control switch 51, the unijunction transistor 84 is in an "off" condition and the D.C. signal is applied across the resistor 86 and charges the capacitor 87. As the charge on the capacitor 87 builds up to a predetermined proportion of the voltage appearing across the base 2 or anode 85 and the cathode 91 of the unijunction transistor 84, the unijunction transistor 84 conducts a pulse along a conductor 93 to the gate 94 of the first SCR 71, turning the first SCR on. As the unijunction transistor 84 conducts, the capacitor 87 is discharged across the biasing resistor 92 and the gate 94 of the first SCR 71. At this time, the unijunction transistor 84 becomes non-conductive and, because the anode circuit of the first SCR remains closed, the first SCR 71 remains conductive during the operation of the motor 22.

The second input 33 from the load circuit 11 is provided by a converter 101 provided with the current transformer 27, having secondary coils 102, 103, and 104 corresponding to the primary coils 23, 24, and 26, of the load circuit 11. The current transformer 27 is linear for currents up to ten times the normal load current in the load circuit 11. The current transformer 27 is effective to convert the normal load current into a normal control signal 105 which is not effective to interrupt operation of the load. In addition, the current transformer 27 is effective to convert the first current surge 28 which occurs upon start-up into a first control signal 106. The second current surge 29 which is generated upon an overload condition in the load is converted by the current transformer 27 into a second control signal 107. Similarly, the current transformer 27 is effective to convert the third current surge 31 existing when there is a short-circuit condition in the load into a third control signal 108.

The converter 101 also includes a diode network 111 fed from the secondaries 102, 103, and 104 of the current transformer 27. Thus, the respective normal, first, second and third control signals 105, 106, 107, and 108 are proportional to the current conditions in the load circuit 11.

An output terminal 112 of the converter 101 is connected to the biasing resistor 65 of the relay circuit 17 to ground. A second terminal 113 of the converter 101 is connected to a junction 114. The junction 114 is connected to both a first blocking network 116 and a second blocking network 117. The first blocking network 116 includes a variable resistance element, such as a potentiometer 118, which may be set to provide a given voltage drop from the junction 114 to the gate 94 of the first SCR 71. The voltage drop produced by the potentiometer 118 is such that neither the normal control signal 105 nor the first nor second control signals 106 and 107 are of sufficient magnitude to pass to the first gate 94 of the first SCR 71 a signal which is sufficient to render the first SCR 71 conductive if it is not in a conductive condition at the time. Thus, the first blocking network 116 is effective to block the passage of the respective normal, first and second control signals 105, 106, and 107 to the gate 94 of the first SCR 71. However, if, for example, during start-up of the motor 22, a short-circuit condition develops, the first blocking network 116 will not block or prevent a biasing or triggering voltage from being applied to the first gate 94 of the first SCR 71. Rather, a portion of the third control signal 108 will be passed through the blocking circuit 116 and will be sufficient to trigger the first SCR 71 and render it conductive. Thus, even if the delay circuit 83 is effective to delay the D.C. signal from the filter network 44, the third control signal 108 which is supplied from the converter 101 simultaneously with the D.C. signal start-up, will be effective to render the first SCR 71 conductive.

Referring again to the junction 114, the third control signal 108 is also applied to the second blocking network 117 which includes a potentiometer 121 connected from the junction 114 to the terminal 78. The potentiometer 121 has a tap 122 which is connected across a temperature sensitive resistor 123 to both the gate 124 of the second SCR 72 and a shunting resistor 126 which is connected to ground. The potentiometer 121 is set so that each of the respective first, second, and third control signals 106, 107, and 108 is effective to apply to the second gate 124 a signal which will condition the second SCR 72 for conduction when a potential is applied to the second anode 74 of the second SCR 72. Thus, the potentiometer 121 is effective to block the application of the normal control signal 105 of the second gate 124, hence, the second gate 124 will not condition the second SCR 72 for operation in response to the normal control signal 105 and the normal control signal 105 will not cause the relay 16 to be de-energized. In the event one of the respective first, second, or third control signals 106, 107 or 108 is applied to the second blocking circuit 117, a signal sufficient to condition the second SCR 72 is applied to the second gate 124, thus, the second SCR 72 is conditioned for operation.

In the event the first SCR 71 has been conditioned for operation and is conducting, such as in the event the third control signal 108 (indicative of a short-circuit condition) has been impressed on the first blocking network 116, the first SCR 71 is conductive. Because the second SCR 72 is conditioned by the third control signal 108, a circuit 131 across both the first and second SCR's 71 and 72 is complete. At this time, current is conducted by the first and second SCR's 71 and 72 such that the voltage from the base 59 to the emitter 57 of the transistor 58 rises to a point at which the voltage applied to the base 59 exceeds that applied to the emitter 57. At this time, the normally "on" transistor 58 is turned off. The circuit from the D.C. input through the relay 16 to ground is thereby opened so that the coil 62 of the relay is de-energized. De-energization of the relay 16 is effective to release the contacts 12, 13 and 14 instantaneously. After the condition causing the short-circuit has been remedied, the anode control switch 68 and the motor control switch 51 are opened. The anode control switch 68 may then be closed to condition the control circuitry for operation.

Referring now to FIGURE 2, it may be understood that the relay circuit 17 may be provided in an alternate form which is suitable for use with a reactor controlled static switch (not shown) which may be connected in the load circuit 11. An alternate relay circuit 131 may be provided with a saturable reactor control winding 132. In this relay circuit 131 may be provided with a saturable reactor control winding 132. In this relay circuit 131, the input 52 from the terminal 49 of the filter nework 44 is applied across the switch 51 to a pair of biasing resistors 133 and 134 which are connected to ground. Intermediate the biasing resistors 133 and 134 is connected a terminal 136. The terminal 136 is connected to the saturable reactor control winding 132. A second terminal 137 is connected to the winding 132, through the terminal 78, and across a biasing resistor 138 to ground. Upon closure of the motor control switch 51 and with the anode control switch 68 closed, the D.C. signal passes from the terminal 136, through the saturable reactor control winding 132 to the terminal 137 and to ground to render the control winding 132 effective to permit current to flow in the coil of a gate circuit of a power switching SCR (not shown) of a saturable reactor control static switch (not shown) which may be provided in the load circuit 11 in place of the contacts 12, 13, and 14 of the relay 16.

In the event a short-circuit condition or an overload condition exists, the respective first and second silicon control rectifiers 71 and 72 are rendered conductive simultaneously and are effective to apply to the terminal 137 of the saturable reactor control winding 132 a D.C. voltage which exceeds that existing on the opposite terminal 136 of the saturable reactor control winding 132. Therefore, current flow through the control winding 132 is reversed and the control winding will no longer permit current to flow in the gate circuit (not shown) of the power switching SCR (not shown) in the load circuit 11. Thus, the load circuit will open instantly to prevent burnout or damage to the motor.

It is to be understood that the above-described arrangements are simply illustrative of an application of the principles of the invention. Numerous other arrangements may be devised by those skilled in the art which will embody the principles of the invention and will fall within the spirit and scope thereof.

What is claimed is:

1. A circuit for protecting a motor from an overload condition in a motor power circuit, which comprises:
    relay circuit means including a first control element having a first control electrode and relay means energized upon conduction of said control element, said electrode normally being biased for rendering said first control element conductive;
    control circuit means connected in parallel with said relay circuit means, said control circuit means including a normally conductive second control element connected in series with a normally non-conductive third control element, said third element having a second control electrode;

coupling means responsive to said overload condition for generating a first control signal and applying said first control signal to said second control electrode to render said third control element conductive and to complete said control circuit means during said overload condition;

means connected to said control circuit means and to said first control electrode, said means being rendered effective upon completing said control circuit means for changing the bias on said first control electrode so that said first control element is rendered non-conductive; and power switching means responsive to de-energization of said relay means for opening said motor power circuit.

2. A motor protection circuit according to claim 1 for protecting a motor from a short-circuit condition during start-up, wherein:

delay means are provided for maintaining said second control element in an off condition during normal start-up;

said motor draws a second current surge during said short-circuit condition;

said coupling means being responsive to said second current surge for bypassing said delay means and applying a second control signal without delay and directly to both said second control element to render said second control element conductive and to said second control electrode to render said third control element conductive simultaneously with said second control element.

3. A motor protection circuit according to claim 1, wherein said motor is protected from a short-circuit type of overload during starting of said motor, said short-circuit overload producing a current surge, which includes:

switch means for energizing said relay circuit means to actuate said power switching means and close said motor power circuit; and means responsive to said switch means for delaying the start of said normally conductive operation of said second control element;

said coupling means being responsive to said current surge to apply a second control signal directly and simultaneously to said second control element to render said second control element conductive and to said third control element to render said element conductive simultaneously with said second element.

4. A motor protection circuit according to claim 3 in which said motor draws a given current during normal operation, wherein:

said delay means delays for a given interval the start of the normally conductive operation of said second control element; and said coupling means is effective to block said given current from said third control element at the end of said given interval so that said third control element is non-conductive during said normal operation.

5. A circuit breaker for protecting a load from overload and short-circuit conditions, said load drawing a normal level of current during normal operation thereof, said load normally drawing a first power surge during start-up, said load drawing an undesirable second power surge in said overload condition and drawing an undesirable third power surge in said short-circuit condition, said third power surge exceeding said second power surge, said circuit breaker comprising:

a circuit for providing power to said load;

relay means energized during normal operation of said load for maintaining said load circuit closed;

a first silicon control rectifier having a first cathode, a first anode and a first gate;

a second silicon control rectifier having an anode connected to said first cathode and having a second gate;

means for converting said first, second, and third power surges and said normal current into respective first, second, third, and fourth control signals having the same relative magnitudes as those of said corresponding surges and current, said first control signal existing only for a selected interval during start-up of said load;

a power circuit connecting said load circuit to said relay means and said anode of said first silicon control rectifier;

delay means connected between said power circuit and said first gate for applying a bias signal to said first gate to turn said first silicon control rectifier on, said delay means being effective to delay application of said bias signal to said first gate during said selected interval to delay operation of said first silicon control rectifier until after said selected interval;

first blocking means for precluding application of said first, second, and fourth control signals to said first gate and for passing said third control signal to said first gate to render said first silicon control rectifier conductive during said selected interval in response to a short-circuit condition so that said second silicon control rectifier is conditioned for conductance;

second blocking means for blocking said first control signal and for passing said first, second, and third control signals to said second gate so that said second silicon control rectifier conducts upon simultaneous conduction of said first silicon control rectifier in response to said start-up, overload and short-circuit condition but is non-conductive during said normal current condition; and circuit means responsive to simultaneous conduction of said first and second silicon control rectifiers for de-energizing said relay means to open said load circuit.

6. A circuit breaker according to claim 5 in which:

said first blocking means is a variable resistance connected to said first gate for bypassing said delay means;

said second blocking means is a variable resistance connected to said second gate; and said relay means includes a normally conductive transistor having a gate which is biased for non-conduction of said transistor upon simultaneous conduction of said first and second silicon control rectifiers.

7. A circuit breaker according to claim 5 in which:

said converting means is a current transformer having linear characteristics up to ten times said normal current.

8. A circuit breaker for protecting a load, wherein said load draws a normal level of current during normal operation thereof, a first power surge for a given period of time during start-up thereof, an undesirable second power surge in an overload condition thereof, and an undesirable third power surge in a short-circuit condition, said third power surge exceeding said second power surge, said circuit breaker comprising:

a circuit for providing power to said load;

means for converting each of said first, second and third power surges into first, second and third control signals, respectively;

a pair of series connected first and second SCR's, said SCR's having first and second gates respectively;

a delay network for rendering said first SCR conductive after said given period of time in response to said first control signal;

first blocking network bypassing said delay network for applying said third control signal to said first gate to render said first SCR conductive when said third control signal occurs prior to the end of said given period of time;

second blocking network for passing to said second gate said second and third control signals to condition said second SCR for conduction, said second SCR being rendered conductive only when said first SCR is conducting; and relay means responsive to simultaneously conduction of said pair of SCR's for opening said circuit.

9. A circuit breaker for protecting a load, wherein said load draws a first power surge for a predetermined period of time during start-up thereof and an undesirable power surge in a short-circuit condition, the short-circuit power surge exceeding the start-up power surge, said circuit breaker comprising:

a circuit for providing power to said load;

relay means for connecting said load to the power;

a pair of series connected first and second control elements in circuit relation with said relay means;

a relay network responsive to the energization of said relay means for rendering said first control element conductive after said predetermined period of time;

means for converting said short-circuit power surge into a control signal;

means responsive to said control signal for rendering said first control element conductive when said control signal occurs prior to the end of said predetermined period of time, and rendering said second control element conductive only when said first control element is conductive; and means for de-energizing said relay means in response to simultaneous conduction of said pair of control elements for opening said circuit.

References Cited

UNITED STATES PATENTS 3,214,677 10/1965 Baude _____ 317—33 X

JOHN F. COUCH, Primary Examiner

R. V. LUPO, Assistant Examiner

U.S. Cl. X.R.

317—33, 36, 49; 318—447, 476

UNITED STATES PATENT OFFICE
CERTIFICATE OF CORRECTION

Patent No. 3,465,206  Dated September 2, 1969

Inventor(s) J. L. HARKER & R. T. KENDALL

It is certified that error appears in the above-identified patent and that said Letters Patent are hereby corrected as shown below:

In the specification, Column 6, Line 26, after the number 132 delete "In this relay".

In the specification, Column 6, delete Line 27 in its entirety.

In the specification, Column 6, Line 28, delete "trol winding 132.".

In the claims, Column 8, Line 30, after the word said delete "first" and insert therefor --fourth--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents